Figure 1:
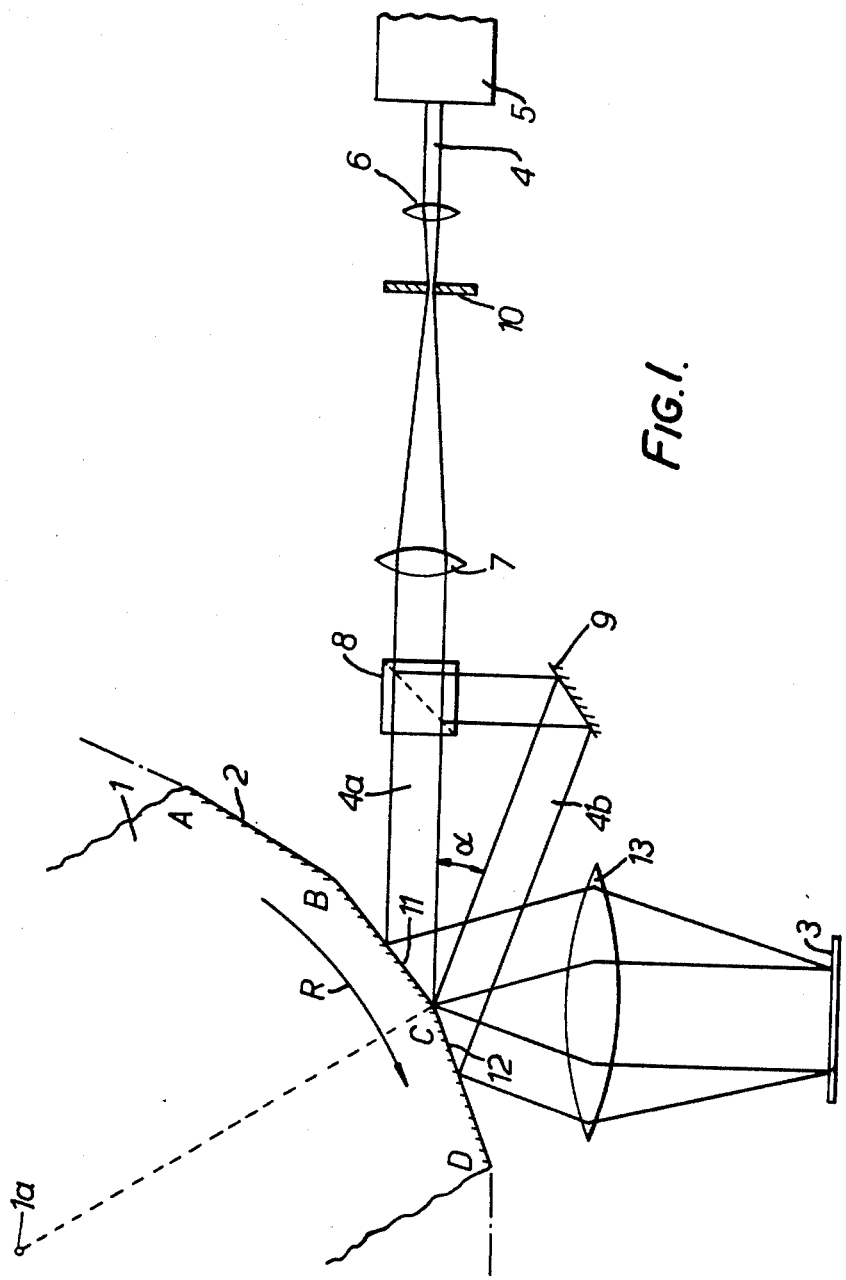

United States Patent [19]
Waterworth et al.

[11] 4,101,193
[45] Jul. 18, 1978

[54] SCANNING SYSTEM

[75] Inventors: Peter Waterworth, Towcester; Douglas Charles John Reid, St. James, both of England

[73] Assignee: Plessey Handel und Investments AG, Zug, Switzerland

[21] Appl. No.: 767,822

[22] Filed: Feb. 11, 1977

[30] Foreign Application Priority Data

Feb. 13, 1976 [GB] United Kingdom ............... 05714/76

[51] Int. Cl.² .................................................. G02B 27/17
[52] U.S. Cl. ....................................... 350/6.8; 355/66; 358/285
[58] Field of Search ............................ 35.0/7, 6, 285; 358/199, 285; 355/66

[56] References Cited

U.S. PATENT DOCUMENTS

| | | | |
|---|---|---|---|
| 3,928,759 | 12/1975 | Sansone | 350/6 |
| 3,973,825 | 8/1976 | Starkweather | 350/6 |
| 3,995,110 | 11/1976 | Starkweather | 350/285 |

*Primary Examiner*—John K. Corbin
*Assistant Examiner*—B. W. de los Reyes
*Attorney, Agent, or Firm*—Fleit & Jacobson

[57] ABSTRACT

A scanning system which includes a rotatable multifaceted polygon, the faceted surfaces of which are optically reflective; a recording means spaced-apart from the said polygon and adapted to move in a direction parallel to the rotational axis of the polygon; light generating means for generating at least one pair of light beams, the light beams of each pair being directed at different angles onto the faceted surface in a manner whereby the regions of the faceted surface illuminated by the beams are in contact with each other in a non-overlapping relationship; modulating means for modulating the said at least one pair of light beams; and focussing means interposed between the said polygon and the said recording means for focussing each pair of light beams reflected from the said polygon onto the said recording means.

9 Claims, 6 Drawing Figures

SCANNING SYSTEM

This invention relates to a scanning system.

According to the invention there is provided a scanning system which includes a rotatable multifaceted polygon, the faceted surface of which is optically reflective; a recording means spaced-apart from the said polygon and adapted to move in a direction parallel to the rotational axis of the polygon; light generating means for generating at least one pair of light beams, the light beams of each pair being directed at different angles onto the faceted surface in a manner whereby the regions of the faceted surface illuminated by the beams are in contact with each other in a non-overlapping relationship; modulating means for modulating the said at least one pair of light beams; and focussing means interposed between the said polygon and the said recording means for focussing each pair of light beams reflected from the said polygon onto the said recording means.

According to a feature of the invention a scanning system as outlined in the preceding paragraph is provided wherein the light generating means include lasing means for generating at least one light beam, focussing means for focussing each light beam onto an associated aperture of the modulating means; collimating means for collimating each of the modulated light beams; beam splitting means for splitting each of the collimated light beams into a pair of light beams, one light beam of each pair being applied directly onto the faceted surface; and deflection means for deflecting the other light beam of each pair onto the faceted surface.

According to another feature of the invention a scanning system as outlined in any one of the preceding paragraphs is provided wherein the light generating means include lasing means for generating at least one light beam capable of being sequentially switched in a linear manner; focussing means for focussing the sequentially switched light beams onto an associated aperture of the modulating means; collimating means for collimating the sequentially switched modulated light beams; beam splitting means adapted to divide each of the sequentially switched, collimated light beams into a pair of light beams.

According to the invention there is also provided a lightning storm analyser incorporating a scanning system as outlined in the preceding paragraphs wherein the rotatable multifaceted polygon is capable of accomodating on its faceted surface, in a direction parallel to the rotational axis thereof, a linear array of light beams; wherein the light generating means include beam splitting means capable of accomodating, in a direction parallel to the major axis thereof, the linear array of light beams, such that each of the light beams of the linear array is split into a pair of light beams; and wherein the modulating means includes a linear array of apertures each one of which is capable of simultaneously accommodating an electrical field strength signal and a light beam, such that a linear array of light beams is emitted from the modulating means.

The foregoing and other features according to the invention will be better understood from the following description of preferred embodiments of the invention with reference to the drawings, in which:

FIG. 1 diagrammatically illustrates a complete scanning system according to the invention and FIGS. 2 to 6 diagrammatically illustrate various stages of one complete facet angle scan of the scanning system depicted in FIG. 1.

A scanning system according to the invention will now be discussed with reference to FIG. 1 of the drawings.

The scanning system includes a multifaceted polygon 1, whose faceted surface 2 comprises a number of facets AB, BC, CD etc., each one of which is optically reflective. The polygon 1 is capable of rotation about a rotational axis 1a, for example, in a direction indicated by the arrow R.

A recording means 3, for example, a photographic film, is spaced-apart from the polygon 1, and is adapted to move in a direction parallel to the rotational axis 1a of the polygon 1.

A pair of light beams 4a and 4b are generated by a light generating means which is spaced-apart from the polygon 1, and which comprises a laser 5, a focussing lens 6, a collimating lens 7, a beam splitter 8 and a deflecting mirror 9.

The laser 5, for example, operating in its fundamental mode generates a light beam 4 which passes first through the focussing lens 6.

The focussing lens 6 focusses the light beam 4 onto an associated aperture of a modulator 10, which is interposed between the focussing lens 6 and the collimating lens 7.

The modulated light beam 4 is then collimated by the collimating lens 7, after which the light beam 4 is directed onto the beam splitter 8.

The beam splitter 8 divides the light beam 4 into the pair of light beams 4a and 4b. The light beam 4a is applied directly onto the faceted surface 2 such that a region 11 of the facet BC is illuminated thereby. The light beam 4b is emitted from the beam splitter 8 at right angles to the light beam 4a, and is deflected onto the faceted surface 2 of the polygon 1 by a deflecting mirror 9, such that a region 12 of the facet CD is illuminated thereby. The light beams 4a and 4b are, therefore, applied to the faceted surface 2 at different angles in a manner whereby an angle $\alpha$ exist therebetween, and whereby the regions 11 and 12 just come into contact with each other in a non-overlapping manner.

The light beams 4a and 4b are reflected from the faceted surface 2 and focussed by a focussing lens 13 onto the surface of the recording means 3.

As the polygon 1 rotates through one facet angle, i.e. the angle subtended by one facet at the rotational axis, two complete scans of the recording means 3 are achieved, the various stages of this procedure being diagrammatically illustrated in FIGS. 2 to 6 of the drawings.

Figure 2:
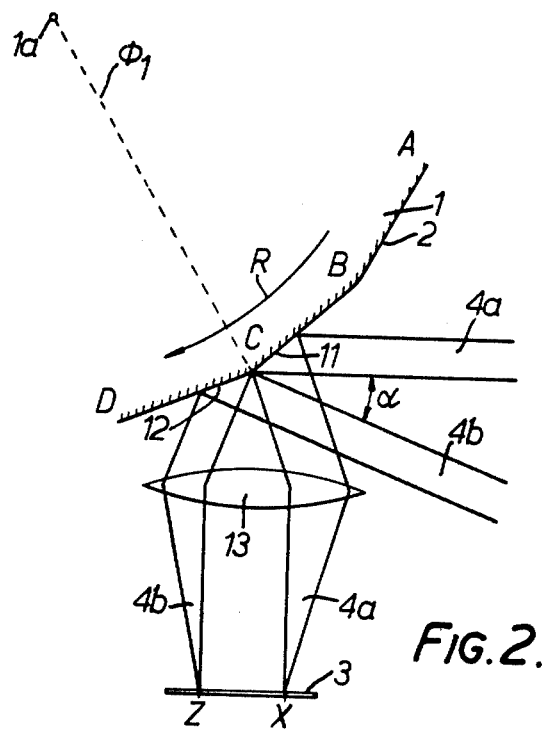

With reference to FIG. 2 of the drawings, in which is diagrammatically illustrated a portion of the scanning system of FIG. 1 prior to the rotation of the polygon 1 in the direction denoted by the arrow R, i.e. the value of the angle $\phi_1$ is zero.

The light beam 4a is applied directly onto the faceted surface 2 causing illumination of the region 11 of the facet BC. The light beam 4b is applied at an angle to the faceted surface 2 causing illumination of the region 12 of the facet CD. The light beams 4a and 4b are, therefore, applied to the faceted surface 2 at different angles in a manner whereby the angle $\alpha$ exists therebetween, and whereby the regions 11 and 12 just come into contact with each other in a non-overlapping manner.

The light beam 4a is reflected from the faceted surface 2, and is focussed by the focussing lens 13 to a point X on the recording means 3. The point X being the beginning of the scan recorded by the recording means 3.

The light beam 4b is reflected from the faceted surface 2 and is focussed by the focussing lens 13 to a point Z on the recording means 3. The point Z being the end of the scan recorded by the recording means 3.

Figure 3:
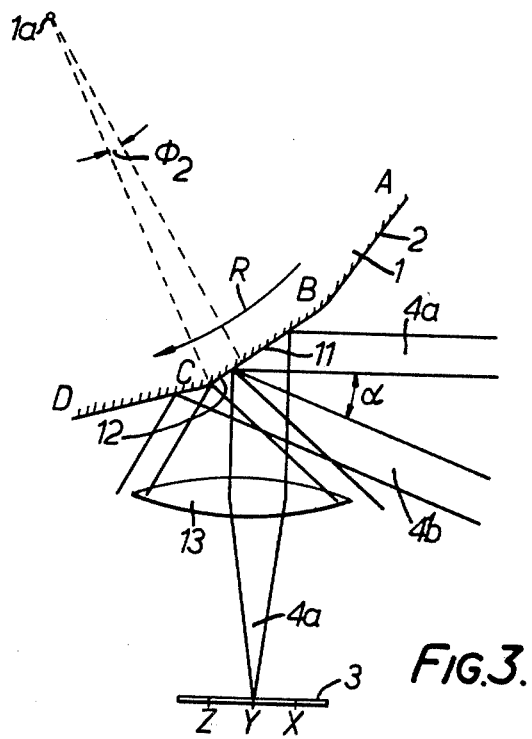

With reference to FIG. 3 of the drawings, the polygon 1 is rotated in the direction of the arrow R through an angle $\phi_2$.

The light beams 4a and 4b are, therefore, applied to the faceted surface 2 at different angles in a manner whereby the angle $\alpha$ exists therebetween, and whereby the regions 11 and 12 just come into contact with each other in a non-overlapping manner. Due to the rotation of the polygon 1 the regions 11 and 12 have moved along the faceted surface 2 in a direction opposite to the direction of rotation.

The light beam 4a is reflected from the faceted surface 2 such that the reflected light beam associated therewith is collected and focussed by the focussing lens 13 to a point Y on the recording means 3. The point Y being between the point X and the point Z. Hence the scan recorded on the recording means 3 for the reflected light beam associated with the light beam 4a has moved from the point X in the direction of rotation to the point Y.

However, due to the movement of the region 12 the light beam 4b undergoes vignetting at the intersection of the facets CD and BC such that a pair of reflected beams associated therewith are emitted in such a manner from the faceted surface 2 that they are not collected and focussed by the focussing lens 13. Thus the scan recorded on the recording means 3 is that associated with the light beam 4a.

Figure 4:
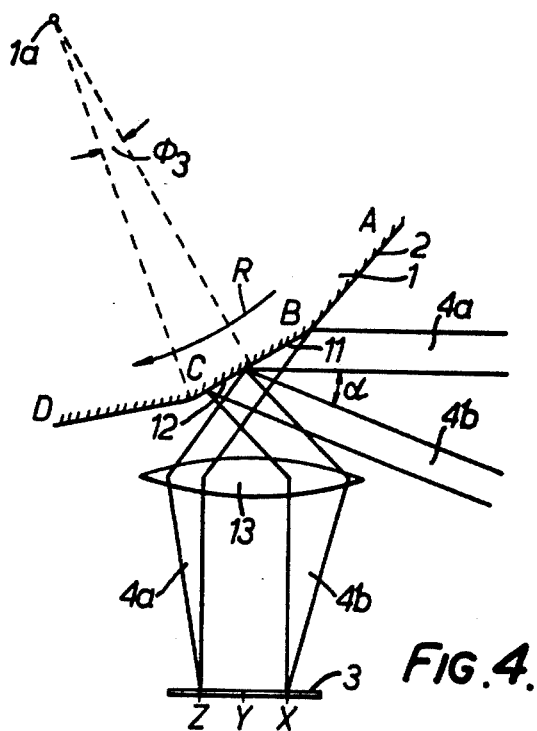

With reference to FIG. 4 of the drawings, the polygon 1 is then rotated further in the direction of the arrow R specified by the angle $\phi_3$. The light beam 4a is reflected from the faceted surface 2 such that the reflected light beam associated therewith is collected and focussed by the focussing lens 13 to the point Z on the recording means 3. Hence, the scan recorded on the recording means 3 for the reflected light beam associated with the light beam 4a has moved from the point Y in the direction of rotation to the point Z.

The light beam 4b is reflected from the faceted surface 2 such that the reflected beam associated therewith is collected and focussed by the focussing lens 13 to a point X on the recording means 3.

Figure 5:
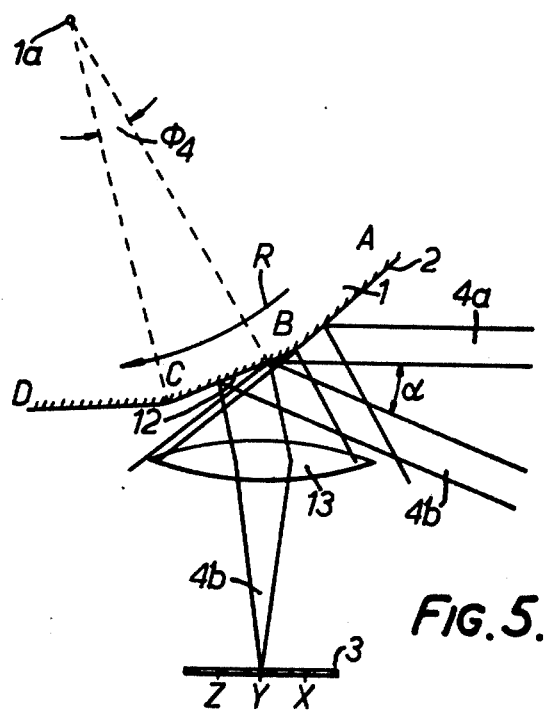

Next, with reference to FIG. 5 of the drawings, the polygon 1 is then further rotated in the direction of the arrow R to the angle $\phi_4$.

Due to the further rotation of the polygon 1 the regions 11 and 12 associated with each of the light beams 4a and 4b have moved further in the direction opposite to the direction of rotation of the polygon 1, such that region 11 illuminates a portion of both the facet BC and the facet AB, and such that the region 12 illuminates a portion of the facet BC. Due to the movement of the region 11 the light beam 4a undergoes vignetting at the intersection of the facets BC and AB, such that a pair of reflected beams associated therewith are emitted in such a manner from the faceted surface 2, that they are not collected and focussed by the focussing lens 13.

The light beam 4b is reflected from the faceted surface 2 such that the reflected light beam associated therewith is collected and focussed by the focussing lens 13 to a point Y on the recording means 3. Hence, the scan recorded on the recording means 3 for the reflected light beam associated with the light beam 4b has moved from the point X to the point Y. Thus the scan recorded on the recording means 3 is that associated with the light beam 4b.

Figure 6:
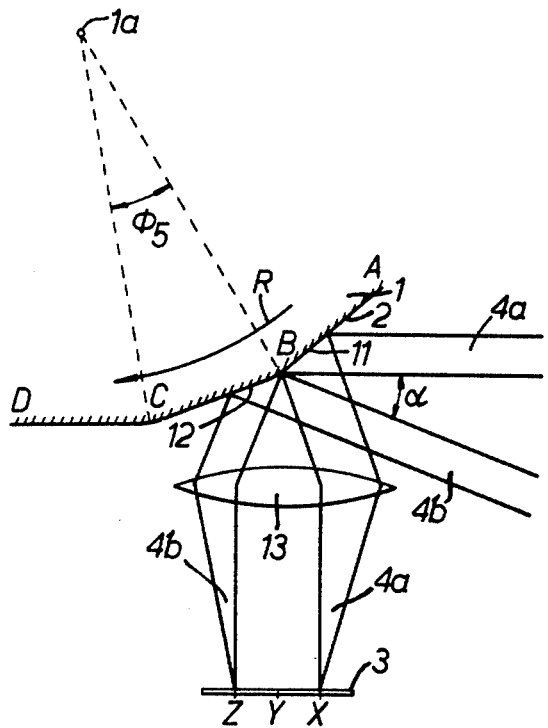

Lastly with reference to FIG. 6 of the drawings, the polygon 1 is further rotated in the direction of the arrow R to the angle $\phi_5$ i.e. one complete facet angle.

The light beam 4a is reflected from the faceted surface 2 such that the reflected light beam associated therewith is collected and focussed by the focussing lens 13 to the point X on the recording means 3.

The light beam 4b is reflected from the faceted surface 2 such that the reflected light beam associated therewith is collected and focussed by the focussing lens 13 to the point Z on the recording means 3.

Thus for one complete facet angle rotation of the polygon 1, two complete scans have been recorded on the recording means 3.

The data recorded on the recording means 3 being a number of scans of varying intensity. The intensity of the scans recorded on the recording means 3 between the points X and Z being directly related to the intensity of the light beam emitted from the modulator 10.

A modification that can be made to the scanning system as described in the preceding paragraphs is that the light generating means can include a laser which is adapted to sequentially switch a light beam in a linear manner to each of a number of positions. Each of the sequentially switched light beams is then passed through a focussing lens which focusses the light beams onto a modulator which comprises a linear array of apertures each one of which is adapted to receive a separate one of the sequentially switched light beams. After modulation, each of the sequentially switched light beams is collimated by a collimating lens, and then directed onto a beam splitter. The beam splitter being adapted to accomodate all of the sequentially switched light beams and to divide each of the light beams into a pair of beams.

An application of the scanning system as described in preceding paragraphs is a lightning storm analyser that includes a rotatable multifaceted polygon which is adapted to accomodate on its faceted surface, in a direction parallel to the major axis thereof, a linear array of light beams.

Also included in the lightning storm analyser is a light generating means that includes a beam splitter which is adapted to accomodate, in a direction parallel to the major axis thereof, the linear array of light beams, for example, an array of 80 light beams. The beam splitter is adapted to divide each of the light beams of the linear array into a pair of light beams.

The lightning storm analyser can also include a modulating means having a linear array of apertures associated therewith. Each one of the apertures is adapted to simultaneously accommodate a field strength signal and a light beam, such that a linear array of light beams is emitted from the modulator.

In the lightning storm analyser the recording means is adapted to simultaneously record a number of reflected light beams from the faceted surface of the polygon. The data received by the recording means being in the form of a number of scans of varying light intensity.

One of the main uses of the scanning system is its use in the analysis of lightning storms, however, the scanning system could be used to record any large volume of data in which a high data recording rate is necessary.

It is to be understood that the foregoing description of specific examples of this invention is made by way of example only and is not to be considered as a limitation in its scope.

What is claimed is:

1. A scanning system which includes a rotatable multifaceted polygon having an angle $\phi$ between adjacent facet edges, the faceted surfaces of which are optically reflective; a recording means spaced-apart from the said polygon and adapted to move in a direction parallel to the rotational axis of the polygon; light generating means for generating at least 2 light beams, directing means for directing the 2 light beams at different angles onto the faceted surface and in contact with each other at said faceted surface in a non-overlapping relationship; modulating means for modulating the said at least two light beams; and first focussing means interposed between the said polygon and the said recording means for focussing said two light beams reflected from the said polygon onto the said recording means to produce two complete scans of the recording means for a single angle rotation $\phi$ of the polygon.

2. A scanning system as claimed in claim 1 wherein the light generating means include lasing means for generating at least one light beam; second focussing means for focussing each light beam onto an associated aperture of the modulating means; collimating means for collimating each of the modulating light beams; said directing means comprising beam splitting means for splitting each of the collimated light beams into two light beams, one light beam of each pair being applied directly onto the faceted surface, and deflection means for deflecting the other light beam onto the faceted surface.

3. A scanning system as claimed in claim 2 wherein the light generating means include lasing means for generating at least one light beam capable of being sequentially switched in a linear manner; focussing means for focussing each of the sequentially switched light beams onto an associated aperture of the modulating means; collimating means for collimating the sequentially switched modulated light beams; beam splitting means adapted to divide each of the sequentially switched, collimated light beams into two light beams.

4. A scanning system as claimed in claim 3 wherein the recording means includes a photosensitive film.

5. A scanning system as claimed in claim 4 wherein each one of said first and second focussing means consist of at least one lens.

6. A scanning system as claimed in claim 5 wherein the collimating means consists of at least one lens.

7. A scanning system as claimed in claim 2 wherein said beam splitting means and said deflection means are positioned relative to each other and relative to said polygon such that said one light beam and said other light beam are directed at said faceted surface of said polygon in contact with each other and in a non-overlapping relationship at different angles such that the angle between said light beams is $\alpha$.

8. A lightning storm analyser incorporating a scanning system as claimed in claim 1 wherein the rotatable multifaceted polygon is capable of accomodating on its faceted surface, in a direction parallel to the rotational axis thereof, a linear array of light beams; wherein the light generating means include beam splitting means capable of accomodating, in a direction parallel to the major axis thereof, the linear array of light beams such that each of the light beams of the linear array is split into two light beams; and wherein the modulating means includes a linear array of apertures each one of which is capable of simultaneously accomodating an electrical field strength signal and a light beam such that a linear array of light beams is emitted from the modulating means.

9. A scanning system as claimed in claim 1 wherein said first focussing means is positioned relative to said polygon such that when either light beam of said two light beams is directed onto the facets at the intersection of the facets, the reflected beam from said facet intersection does not pass through said first focussing means.

* * * * *